United States Patent
Choi et al.

(10) Patent No.: US 11,919,496 B2
(45) Date of Patent: Mar. 5, 2024

(54) AUTOMATED BRAKING TEST SYSTEM AND METHOD

(71) Applicants: Hyundai Motor Company, Seoul (KR); Kia Corporation, Seoul (KR)

(72) Inventors: Hae Ryong Choi, Seoul (KR); Dong Yoon Hyun, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 317 days.

(21) Appl. No.: 17/467,000

(22) Filed: Sep. 3, 2021

(65) Prior Publication Data

US 2022/0194350 A1    Jun. 23, 2022

(30) Foreign Application Priority Data

Dec. 22, 2020    (KR) .................. 10-2020-0180877

(51) Int. Cl.
 *B60T 17/22*    (2006.01)
(52) U.S. Cl.
 CPC ....... *B60T 17/221* (2013.01); *B60T 2270/402* (2013.01); *B60T 2270/406* (2013.01); *B60T 2270/413* (2013.01)
(58) Field of Classification Search
 CPC ............. B60T 17/221; B60T 2270/402; B60T 2270/404; B60T 2270/406; B60T 2270/413; B60T 2270/82
 USPC ............... 701/70–98; 73/116.01, 121–132
 See application file for complete search history.

(56) References Cited

U.S. PATENT DOCUMENTS

| | | | | |
|---|---|---|---|---|
| 4,567,757 A * | 2/1986 | Melocik | .................... | G01L 5/28 701/70 |
| 5,705,744 A * | 1/1998 | Brugger | .................... | G01L 5/28 73/123 |
| 8,311,699 B2 * | 11/2012 | Brown | ...................... | G01L 5/28 701/33.9 |
| 9,003,872 B2 * | 4/2015 | Jeon | ...................... | B60T 8/4086 73/132 |
| 2009/0000369 A1 * | 1/2009 | Sanpitak | ............... | B60T 17/221 73/121 |
| 2011/0214496 A1 * | 9/2011 | Cahill | ................... | B60T 17/221 73/121 |
| 2013/0066532 A1 * | 3/2013 | Brown | .................... | B60T 8/171 73/122 |

FOREIGN PATENT DOCUMENTS

KR          10-0162790 B      5/1999

* cited by examiner

*Primary Examiner* — Erick R Solis
(74) *Attorney, Agent, or Firm* — MORGAN, LEWIS & BOCKIUS LLP

(57) ABSTRACT

An automated braking test system may include a test request input unit of an automated braking test request, an automated test controller electrically connected to the test request input unit and configured to generate an automated test signal for evaluating braking performance of a vehicle according to the automated braking test request received from the test request input unit, and a braking controller electrically connected to the automated test controller and configured to control braking of a vehicle based on the automated test signal or a braking request signal from a pedal sensor electrically connected to the automated test controller.

18 Claims, 3 Drawing Sheets

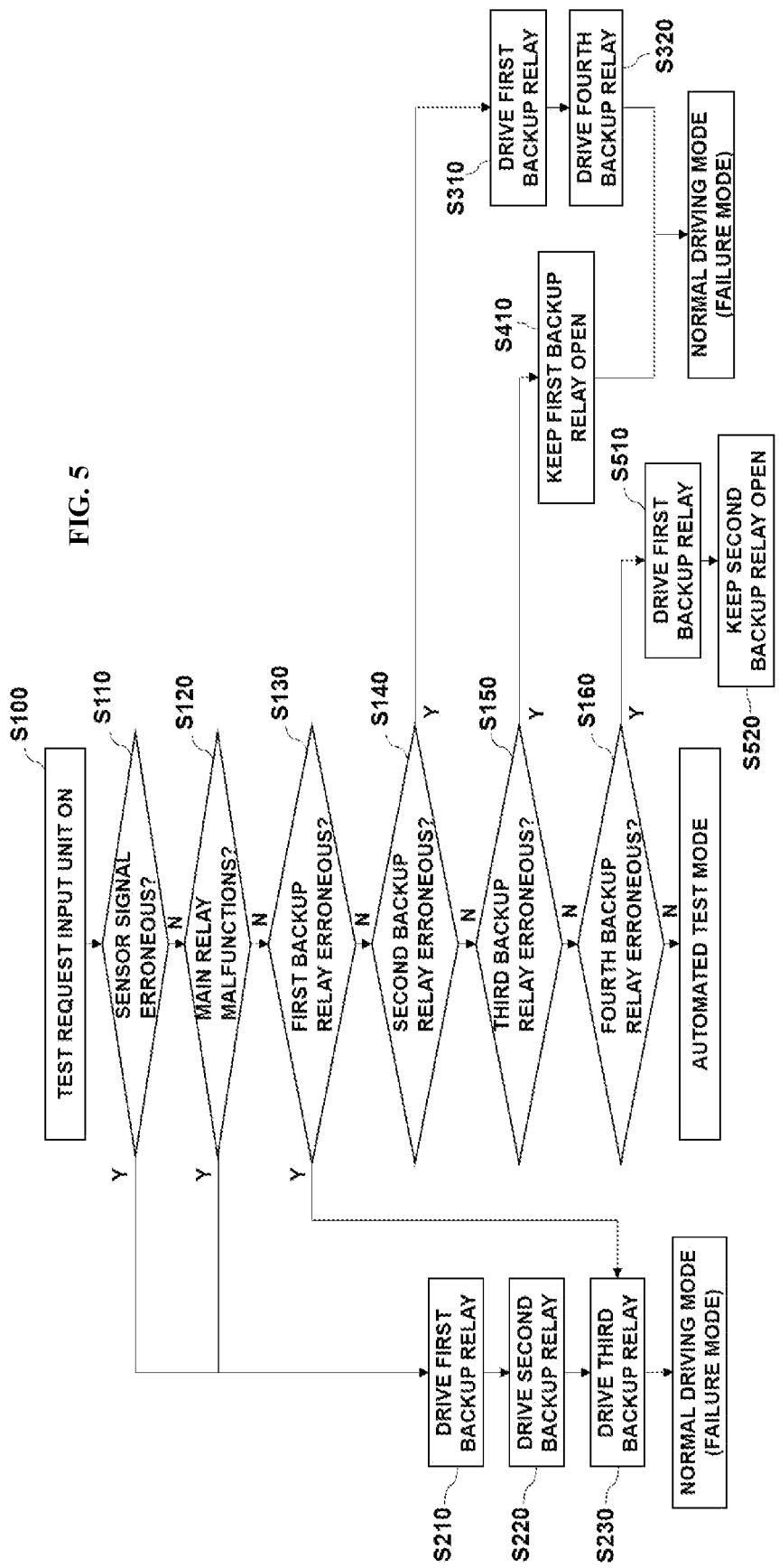

AUTOMATED BRAKING TEST SYSTEM AND METHOD

CROSS-REFERENCE TO RELATED APPLICATION

The present application claims priority to Korean Patent Application No. 10-2020-0180877 filed on Dec. 22, 2020, the entire contents of which is incorporated herein for all purposes by this reference.

BACKGROUND OF THE INVENTION

Field of the Invention

The present invention relates to an automated test system of a vehicle, and more particularly to an automated braking test system and a braking test method for automatically evaluating the braking performance of a vehicle including a brake-by-wire (BBW) system or an electronic brake system provided therein.

Description of Related Art

According to drive-by-wire technologies, it is possible to reduce the number of hardware, to remove a hydraulic circuit, to reduce a weight and volume due to the use of electrical and electronic interfaces, and to ensure ease of design using a system for conversion between a mechanical system controlled using a mechanical link or a hydraulic pressure and an electric system in a vehicle. Accordingly, in the drive-by-wire technologies, a conventionally applied mechanical control system has been replaced with an electronic control system using an electromechanical actuator or the like.

According to brake-by-wire (BBW) technologies, as one of the drive-by-wire technologies, it is possible to control braking through an electrical means. A performance evaluation test of a vehicle having an electronic braking system or BBW technology installed therein is started by inputting a tester's braking intention through a pedal sensor. The tester's braking intention is transferred to a BBW system, and the BBW system exhibits braking control performance for each test mode using a logic therein.

It is required to evaluate the performance of test vehicles under uniform and consistent test conditions with respect to each test vehicle when conducting a performance evaluation. Furthermore, it is required to efficiently evaluate a large number of test vehicles, and it is also required to ensure safety by reducing work fatigue of a worker.

The extent of dispersion in evaluation results may vary depending on how much the tester or the driver is experienced in testing a vehicle having the BBW system. Furthermore, man-hours may drastically increase as the evaluation must be repeated due to lack of evaluation reproducibility. The knee of the tester may be injured due to repeated sudden braking, and there is a possibility of damage to the test vehicle.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an automated test system for a brake-by-wire system for improving the reliability of evaluation of an electronic braking system or a brake-by-wire (BBW) system and preventing injuries and accidents.

The objects of the present invention are not limited to the aforementioned objects, and other objects not mentioned will be clearly understood by those of ordinary skill in the art to which various exemplary embodiments of the present invention pertains from the following description.

The present invention may have the following features for achieving the aforementioned objects and performing the following characteristic functions.

According to various exemplary embodiments of the present invention, an automated braking test system includes a test request input unit configured for generating an automated braking test request; an automated test controller electrically connected to the test request input unit and configured to generate an automated test signal for evaluating braking performance of a vehicle according to the automated braking test request received from the test request input unit; and a braking controller electrically connected to the automated test controller and configured to control braking of a vehicle based on the automated test signal or a braking request signal from a pedal sensor electrically connected to the automated test controller.

According to various exemplary embodiments of the present invention, an automated braking test method includes receiving an automated braking test request and a braking request signal; generating, by the automated test controller, an automated test signal which is transmitted to a braking controller through a main relay connected to the braking controller; detecting, by the automated test controller, whether an error is present in the main relay; when an error is not present in the main relay, detecting, by the automated test controller, whether an error is present in a plurality of backup relays connected to the main relay and configured to operate at least one of the plurality of backup relays when an error is present in the main relay; and when an error is not present in the main relay or in the plurality of backup relays, providing the automated test signal to the braking controller to perform braking control of a vehicle according to the automated test signal.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a flowchart of a test scenario of an automated braking test system according to various exemplary embodiments of the present invention.

Figure 1:
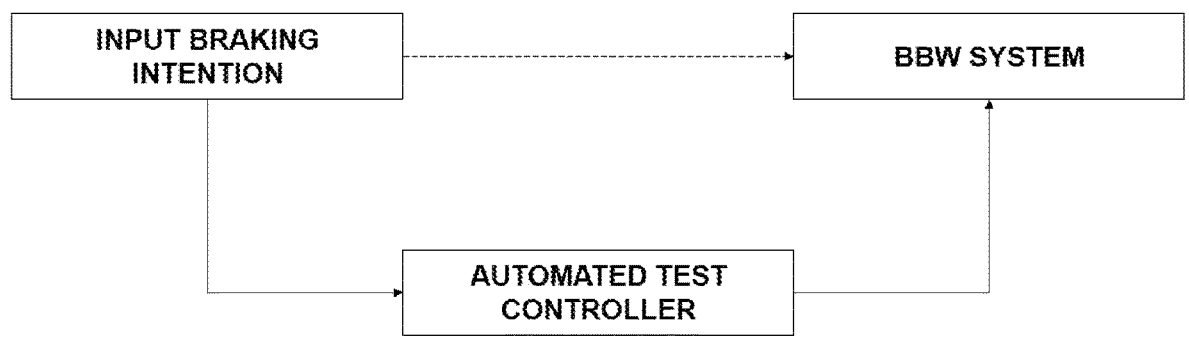
FIG. 1 is a diagram showing the overall operation of an automated braking test system according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, exemplary embodiments of the present invention will be described in detail with reference to the accompanying drawings. Specific structures or functions described in the exemplary embodiments of the present invention are merely for illustrative purposes. Embodiments according to the concept of the present invention may be implemented in various forms, and it should be understood that they should not be construed as being limited to the exemplary embodiments described in the exemplary embodiment, but include all of modifications, equivalents, or substitutes included in the spirit and scope of the present invention.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present invention. Similarly, the second element could also be termed the first element.

It will be understood that when an element is referred to as being "coupled" or "connected" to another element, it may be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between," "directly between," "adjacent to," or "directly adjacent to," should be construed in the same way.

Like reference numerals denote like components throughout the specification. In the meantime, the terminology used herein is for describing various exemplary embodiments only and is not intended to be limiting. As used herein, the singular forms "a," "an," and "the" are intended to include the plural forms as well, unless the context clearly indicates otherwise. It will be further understood that the terms "comprise," "include," "have," etc., when used in the exemplary embodiment, specify the presence of stated components, steps, operations, and/or elements, but do not preclude the presence or addition of one or more other components, steps, operations, and/or elements thereof.

In the specification, the present invention will be described in the context of a brake-by-wire (BBW) system but may also be applied to an electronic braking system.

As shown in FIG. 1, conventionally, a tester's braking intention detected by a pedal sensor is transmitted directly to a BBW system, and the BBW system is configured to show braking performance based on logic installed in the system, which is indicated by the dotted arrow of FIG. 1). On the other hand, according to various exemplary embodiments of the present invention, when the tester's braking intention is input, the tester's braking intention may be transferred directly to the BBW system or may be transmitted to an automated test controller rather than being transmitted directly to the BBW system. An automated test controller may be configured to generate a virtual signal according to an appropriate test evaluation reference based on an input signal of a pedal sensor, may input the virtual signal to the BBW system, and may perform braking control (which is indicated by the solid arrow in FIG. 1).

Accordingly, according to various exemplary embodiments of the present invention, uniform and consistent performance evaluation may be conducted, and the possibility of fatigue and injury of the tester may be reduced.

Hereinafter, the present invention will be described in detail with reference to the accompanying drawings.

Figure 2:
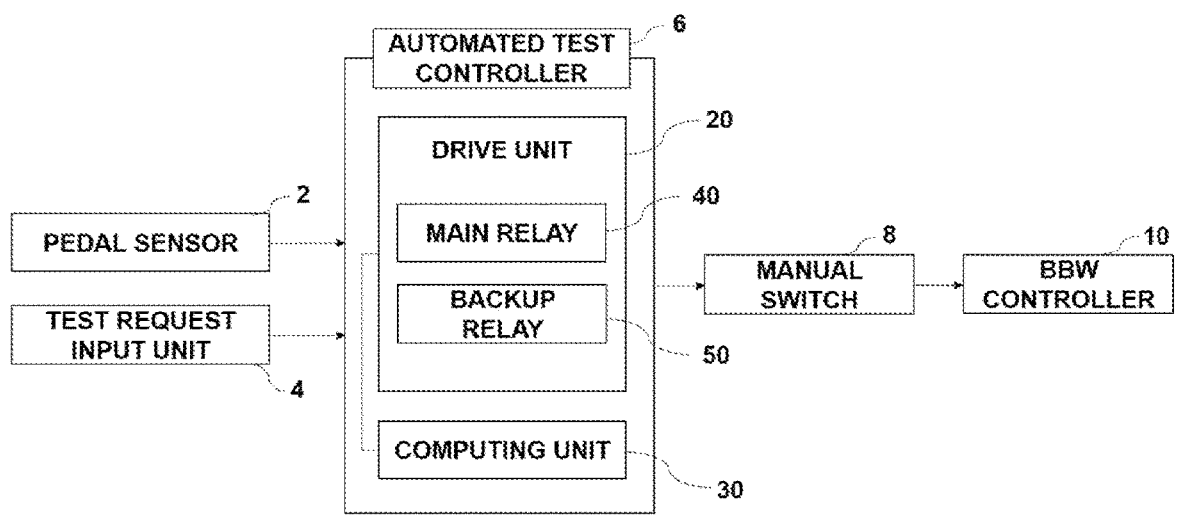
FIG. 2 is a diagram showing the configuration of an automated braking test system according to various exemplary embodiments of the present invention.

As shown in FIG. 2, the automated braking test system according to various exemplary embodiments of the present invention may include a test request input unit 4 and an automated test controller 6.

The test request input unit 4 may be configured to allow a tester to select whether to execute an automated braking test. The test request input unit 4 may be a switch to be turned on or off. When the test request input unit 4 is turned on, the BBW system may enter in a state in which an automated test is capable of being executed.

Input received by the test request input unit 4 may be transferred to the automated test controller 6. ON-input of the test request input unit 4 may be input to a computation unit 30 of the automated test controller 6. The ON-input may ultimately be converted into a virtual signal or an automated test signal generated by the computation unit 30. Then the signal may be transferred to a BBW controller 10 of the BBW system. The BBW controller 10 may implement a braking test according to a scenario based on the transmitted test signal and allow braking capability to be evaluated.

The automated test controller 6 may receive a braking request signal. As an actual braking request signal generated by detecting the tester's braking intention input through a pedal provided in a vehicle through a pedal sensor 2, the braking request signal may be transferred the BBW controller 10. The pedal sensor 2 may include a brake stroke sensor, a brake stop switch, and an accelerator pedal stroke sensor. According to various exemplary embodiments of the present invention, the braking request may be determined based on output information of a brake stroke sensor, a brake stop switch, or the like of a vehicle. As a non-limiting example, when a pedal is depressed, a voltage of a sensor output depending on the angle to which the pedal is depressed may be an actual braking request signal and may be input to the automated test controller 6 or the BBW controller 10. According to various exemplary embodiments of the present invention, the pedal sensor may be configured to output two or more output values to determine whether each pedal sensor malfunctions and ensure a redundancy function at the time of failure.

The automated test controller 6 according to various exemplary embodiments of the present invention may include a drive unit 20 and the computation unit 30.

The drive unit 20 may be implemented by a relay for a signal. Any one of an actual braking request signal and an automated test signal may be transferred to the BBW controller 10 through a relay for a signal of the drive unit 20 based on on-input or off-input of the test request input unit 4. According to various exemplary embodiments of the present invention, the drive unit 20 may include a main relay 40 for performing automated test control and a backup relay 50 for responding to a malfunction.

When the computation unit 30 generates an automated test signal according to on-input of the test request input unit 4, the main relay 40 may transfer the automated test signal to the BBW controller 10. The automated test signal generated by the computation unit 30 may be transmitted to the BBW controller 10 only when the main relay 40 is operating normally.

Figure 3:
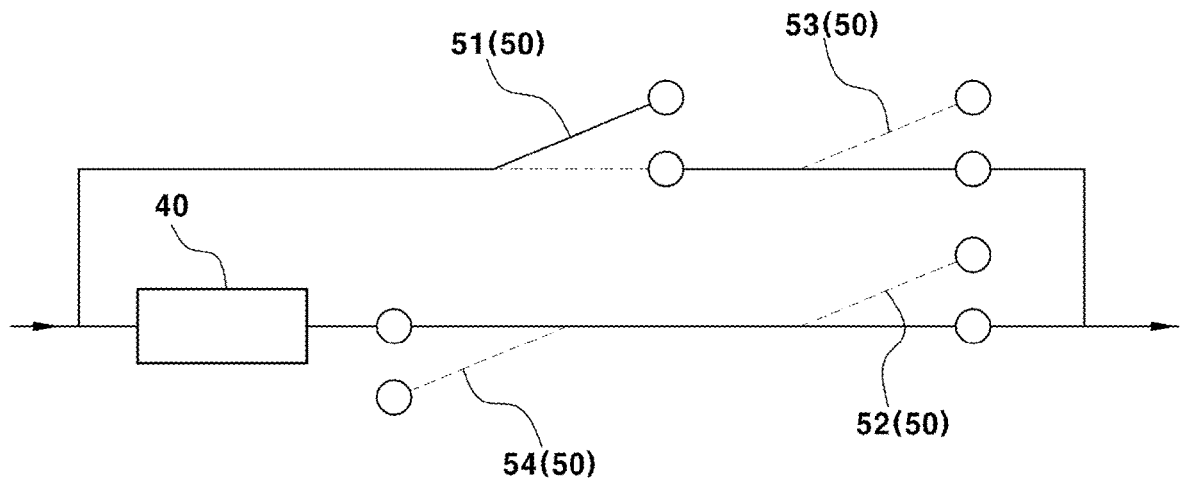
FIG. 3 is a diagram showing a drive unit of an automated braking test system according to various exemplary embodiments of the present invention.

The backup relay 50 may be configured to prevent fatal loss of function in the system due to a malfunction of one relay and may be connected in parallel to the main relay 40. The computation unit 30 may determine whether the main relay 40 malfunctions by comparing signals of opposite end portions of the main relay 40, and in the instant case, upon determining that the main relay 40 malfunctions, the computation unit 30 may drive the backup relay 50 and may convert the mode of the main relay 40 into a normal driving mode to perform braking control (hereinafter referred to as a "normal driving mode") in response to the actual braking request signal from a tester. Referring to FIG. 3, the backup relay 50 may include a first backup relay 51, a second backup relay 52, a third backup relay 53, and a fourth backup relay 54.

The first backup relay 51 may be configured to be operated when the computation unit 30 malfunctions or when a pedal sensor output signal is erroneous, as well as when the main relay 40 malfunctions such that the mode changes to the normal driving mode. The current mode is converted into a normal driving mode in the event of a failure because the failure occurs too suddenly for the tester to recognize failure of the automated test controller 6. When the mode does not rapidly return to the previous normal driving mode through automated control, the tester may be injured due to the dangerous situation.

The second backup relay 52 is normally closed. The second backup relay 52 is opened when the main relay 40 fails. The second backup relay 52 is opened to prevent the output voltage of the main relay 40 from interfering with the output voltage of the first backup relay 51 when the first backup relay 51 is operating after failure of the main relay 40. Accordingly, the interference by the output voltage of the main relay 40 may be prevented.

The third backup relay 53 may be unable to enter a safe state when the first backup relay 51 fails. This is because the output voltage of the first backup relay 51 interferes with the output voltage of the second backup relay 52. To resolve the present problem, the third backup relay 53 change a state thereof from a normally closed state into an open state when the first backup relay 51 fails, normally outputting the output voltage of the main relay 40.

The fourth backup relay 54 is normally closed. When the second backup relay 52 fails, the fourth backup relay 54 may be unable to enter a safe state. This is because the output voltage of the second backup relay 52 may interfere with the output voltage of the third backup relay 53. To prevent this, when the second backup relay 52 malfunctions, the fourth backup relay 54 may be switched to an open state to normally output an output voltage of the third backup relay 53.

The computation unit 30 may be configured to calculate the automated test signal transferred to the BBW controller 10. The computation unit 30 may include a microcontroller, and the function of the microcontroller may be performed by software logic of the microcontroller. The computation unit 30 may implement signal processing, a driving scenario, and control and may respond to failures.

The computation unit 30 may perceive surroundings of the automated test system based on information received from sensors, relays, etc., through a signal-processing function of the computation unit 30. The status information of the system required for safety of the automated test system may be also extracted by the computation unit 30. As a non-limiting example, the computation unit 30 may extract a tester's braking intention from the braking request signal of the pedal sensor 2 and stop switch information for notifying another vehicle about a braking state while braking. As a non-limiting example, the computation unit 30 may extract information for monitoring the state of a relay which is the drive unit 20. As a non-limiting example, the computation unit 30 may obtain a separate signal for recognizing the tester's intention.

Figure 4:
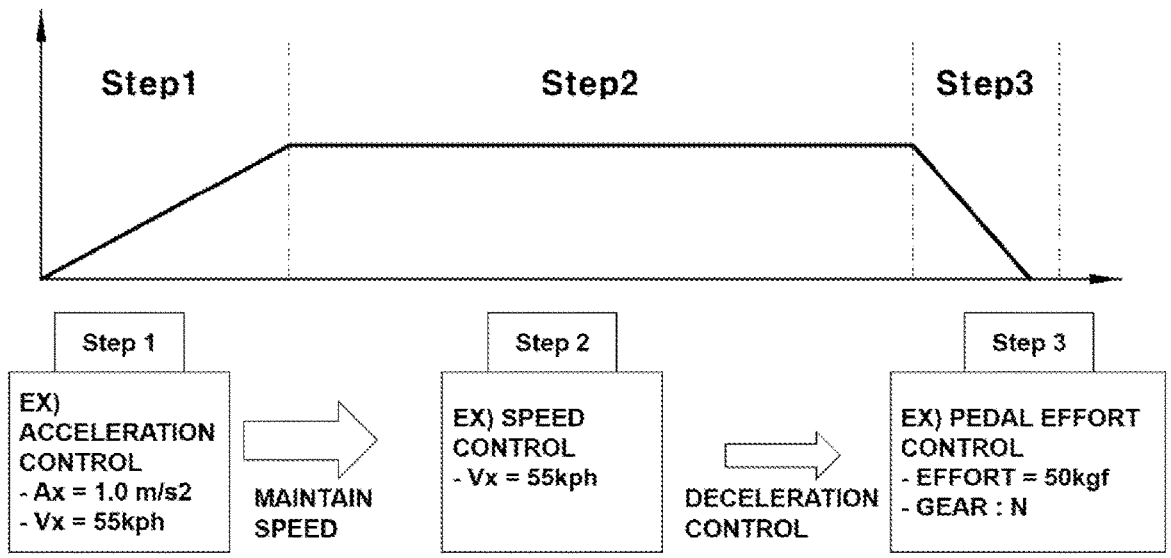
FIG. 4 is a diagram showing an example of a test scenario of an automated braking test system according to various exemplary embodiments of the present invention.

The computation unit 30 may implement a driving scenario and control based on respective scenarios. As exemplified in FIG. 4, the driving scenario may include a scenario related to braking regulation evaluation certification, and the computation unit 30 may implement braking control logic for each scenario. As a non-limiting example, the computation unit 30 may implement acceleration or deceleration control logic based on each scenario and may also perform control, such as emergency braking and steering for ensuring stability based on a scenario. As a non-limiting example, the computation unit 30 may perform a function for evaluation by measuring the characteristics of a vehicle and then automatically embodying control gain settings.

Referring to FIG. 2 again, the automated test system according to various exemplary embodiments of the present invention may include a manual switch 8. According to various exemplary embodiments of the present invention, the manual switch 8 may include a mechanical switch. The manual switch 8 may be engaged to change the mode into the normal driving mode when the tester determines that the automated test system is unstable despite the various failure prevention mechanisms provided in the automated test system according to various exemplary embodiments of the present invention. According to various exemplary embodiments of the present invention, the manual switch 8 may include two or more manual switches. When any one of a plurality of manual switches 8 malfunctions, that is, when the current mode is not converted into the normal driving mode even if one of the manual switches is operated, the other one manual switch may be switched to independently perform control so that the vehicle is driven in the normal driving mode.

The computation unit 30 may determine malfunctions of the system and respond to the malfunctions. The computation unit 30 may determine failure of the pedal sensor 2 and the drive unit 20 through the received signal and may control the system to take an appropriate measure. The computation unit 30 may compare two sensor output values input to the automated test controller 6 from the pedal sensor 2. When there is difference between the output values, the computation unit 30 may determine that a signal of the corresponding sensor is erroneous. To determine whether a relay malfunctions, the computation unit 30 may determine consistency by comparing an expected value based on an input and output values of a relay in a normal operation condition with an actual input and output values. Then the computation unit 30 may determine that the relay malfunctions when the expected values and the actual input and output values are different from each other.

When determining that the relay malfunctions, the computation unit 30 may transmit a signal indicating to take measures for failure to perform a backup function in response to failure of the system, and the drive unit 20 may be controlled. As described above, the backup relay 50 may include the first backup relay 51, the second backup relay 52, the third backup relay 53, and the fourth backup relay 54, and may be configured to prevent the automated test system from entering an inoperative state due to failure of any one of the four backup relays.

When the main relay 40 malfunctions, the first backup relay 51 may be operated such that the mode is converted into the normal driving mode. That is, a virtual signal for an automated test may not be transmitted to the BBW controller 10, and an actual braking request signal for braking based on a pedal signal of the tester may be transferred to the BBW controller 10.

An output voltage of the main relay 40 that has been determined to malfunction may interfere with a pedal signal output bypassed in the first backup relay 51. To remove such interference, the second backup relay 52 is provided to maintain a circuit in an open state in case of failure. The initial state of the second backup relay 52 may be set to a normally closed state.

When the first backup relay 51 is determined to malfunction, the automated test system may be operated normally through the main relay 40 and the second backup relay 52. However, in the instant case, the output voltage of the malfunctioning first backup relay 51 may interfere with a normal automated test output. Thus, the third backup relay 53 is disposed to maintain a circuit in an open state to remove the interference. The initial state of the third backup relay 53 may be set to a normally closed state.

The fourth backup relay 54 may be switched to an open state to respond to failure of the third backup relay 53. The initial state of the fourth backup relay 54 may be a normally closed state.

A method of controlling a system according to various exemplary embodiments of the present invention will be described in detail with reference to FIG. 5.

When receiving a test request (ON) from the test request input unit 4 (S100), the automated test controller 6 may first determine whether an error occurs in a sensor signal (S110). As described above, the sensor may include a brake pedal stroke sensor, an accelerator pedal stroke sensor, and a brake stop switch, and in the instant case, failure of the sensor may mean that an error is present in a sensor signal between the sensor and the automated test controller 6, but not failure of the sensor itself.

When an error is present in the sensor signal, the automated test controller 6 or the computation unit 30 may sequentially drive the first backup relay 51, the second backup relay 52, and the third backup relay 53 to maintain the circuit in an open state (S210, S220, and S230).

When determining that an error is not present in the sensor signal, the automated test controller 6 or the computation unit 30 may determine whether an error is present in the main relay 40 (S120).

When an error is present in the main relay 40, the automated test controller 6 may drive the first backup relay 51 (S210). As described above, to prevent an output voltage of the main relay 40 from interfering with a pedal signal (normal driving mode) bypassed by the backup relay 50 even if the main relay 40 malfunctions, the second backup relay 52 and the third backup relay 53 may be sequentially open to maintain a circuit in an open state (S220 and S230). According to various exemplary embodiments of the present invention, in particular, when the first backup relay 51 malfunctions, the third backup relay 53 may be configured to open (S230).

Accordingly, the vehicle may be driven in the normal driving mode (a failure mode), in which the tester's braking intention detected by the pedal sensor 2 is transferred to the BBW controller 10 and the vehicle brakes according to the tester's braking intention.

When the main relay 40 is operating normally, the automated test controller 6 may determine whether an error is present in the first backup relay 51 (S130).

When an error is present in the first backup relay 51, the third backup relay 53 may be driven to maintain a circuit in an open state (S230), and may drive the vehicle in the normal driving mode. Even if an error is present in the first backup relay 51, when the main relay 40 is operating normally, the automated test system may be operated through the main relay 40 and the second backup relay 52. However, the output voltage of the malfunctioning first backup relay 51 interferes with output of a signal for a normal automated test. Thus, when the first backup relay 51 malfunctions, a circuit may be maintained in an open state through the third backup relay 53.

When an error is not present in the first backup relay 51, the automated test controller 6 may determine whether the second backup relay 52 malfunctions (S140).

When the second backup relay 52 malfunctions, the automated test controller 6 may drive the first backup relay 51 and the fourth backup relay 54 (S310 and 320). The first backup relay 51 may be driven to change the current mode into the normal driving mode, and the output voltage of the malfunctioning second backup relay 52 and the output voltage of the third backup relay 53 may be prevented from interfering with each other by driving the fourth backup relay 54.

When the second backup relay 52 is operating normally, whether the third backup relay 53 malfunctions may be determined (S150).

When an error is present in the third backup relay 53, the automated test controller 6 may maintain the first backup relay 51 in an open state (S410). At the instant time, the main relay 40 and the second backup relay 52 are operating normally, so that the automated test signal may be output. The current mode may still be switched into the normal driving mode for safety.

When the third backup relay 53 is operating normally, the computation unit 30 may determine whether an error occurs in the fourth backup relay 54 (S160).

Upon determining that the fourth backup relay 54 malfunctions, the automated test controller 6 may drive the first backup relay 51 (S510) and may maintain the second backup relay 52 in an open state (S520). Accordingly, the vehicle may be operated in the normal driving mode.

When the fourth backup relay 54 is operating normally, the vehicle may be driven in an automated test mode according to a virtual signal generated by the computation unit 30. The present invention may provide an automated braking test system having enhanced safety and reliability by transferring an automated test signal to the BBW controller when both the main relay 40 and the backup relay 50 are operating normally.

According to various exemplary embodiments of the present invention, it is possible to increase development efficiency and to prevent accidents through automated evaluation of a brake-by-wire (BBW) system.

According to various exemplary embodiments of the present invention, distribution of evaluation data may be appropriately maintained through objective evaluation, and the reliability of evaluation may be improved by increasing consistency with an evaluation reference.

The present invention may overcome of a wide distribution of evaluation results depending on the degree of proficiency of a driver by installing a feedback control function in an automated test system.

According to various exemplary embodiments of the present invention, a complete automated evaluation system may be achieved through integration with a steering system in the future.

The present invention may provide an automated test system having enhanced reliability by including a mechanism for responding to the possibility of failure and failure of the test system.

The present invention may provide an automated braking test system for improving the reliability of evaluation of an electronic braking system or a brake-by-wire (BBW) system and automatically performing a braking test by preventing injuries and accidents.

It will be appreciated by persons skilled in the art that the effects capable of being achieved through the present invention are not limited to what has been described hereinabove, and other advantages of the present invention Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An automated braking test system comprising:
   a test request input unit configured for generating an automated braking test request;
   an automated test controller electrically connected to the test request input unit and configured to generate an automated test signal for evaluating braking performance of a vehicle according to the automated braking test request received from the test request input unit; and
   a braking controller electrically connected to the automated test controller and configured to control braking of a vehicle according to the automated test signal or a braking request signal from a pedal sensor electrically connected to the automated test controller,
   wherein the automated test controller includes:
     a main relay configured to transfer the automated test signal to the braking controller; and
     a plurality of backup relays connected to the main relay and configured to be operated to control the braking of the vehicle according to the braking request signal of the pedal sensor upon determining that the main relay malfunctions.

2. The automated braking test system of claim 1, wherein the braking controller includes a controller of an electronic braking system or a controller of a brake-by-wire system.

3. The automated braking test system of claim 1, wherein the plurality of backup relays includes:

a first backup relay configured to be operated by the automated test controller to transfer the braking request signal to the braking controller when the main relay malfunctions; and a second backup relay configured to be operated by the automated test controller to block output of the malfunctioning main relay.

4. The automated braking test system of claim 3, wherein the first backup relay is connected in parallel to the main relay and the second backup relay is connected in series to the main relay.

5. The automated braking test system of claim 1, wherein the plurality of backup relays includes:

a first backup relay connected in parallel to the main relay and being normally open;

a second backup relay connected in series to the main relay and being normally closed; and a third backup relay connected in series to the first backup relay in order of the first backup relay and the third backup relay and being normally closed.

6. The automated braking test system of claim 5, wherein, when an error is present in the first backup relay, the third backup relay is opened by the automated test controller.

7. The automated braking test system of claim 5, wherein, when an error is present in the main relay and the first backup relay is closed, the second backup relay is opened by the automated test controller.

8. The automated braking test system of claim 5, further including a fourth backup relay disposed between the main relay and the second backup relay and being in a normally closed state.

9. The automated braking test system of claim 1, further including a manual switch, which is switched to control the braking of the vehicle according to the braking request signal instead of the automated test signal.

10. An automated braking test method comprising:

receiving, by an automated test controller, an automated braking test request and a braking request signal;

generating, by the automated test controller, an automated test signal which is transmitted to a braking controller through a main relay connected to the braking controller;

detecting, by the automated test controller, whether an error is present in the main relay;

when an error is not present in the main relay, detecting, by the automated test controller, whether an error is present in a plurality of backup relays connected to the main relay and operating, by the automated test controller, at least one of the plurality of backup relays upon determining that an error is present in the main relay; and when an error is not present in the main relay or in the plurality of backup relays, providing, by the automated test controller, the automated test signal to the braking controller to perform braking control of a vehicle according to the automated test signal.

11. The automated braking test method of claim 10, further including:

when an error is present in the main relay or the plurality of backup relays, providing, by the automated test controller, the braking request signal to the braking controller to perform the braking control according to the braking request signal.

12. The automated braking test method of claim 11, wherein the plurality of backup relays includes:

a first backup relay connected in parallel to the main relay and being in a normally open state;

a second backup relay connected in series to the main relay and being in a normally closed state;

a third backup relay connected in series to the first backup relay in order of the first backup relay and the third backup relay and being in a normally closed state; and a fourth backup relay disposed between the main relay and the second backup relay and being in a normally closed state.

13. The automated braking test method of claim 12, further including:

determining, by the automated test controller, whether an error is present in the main relay; and upon determining that an error is present in the main relay, closing the first backup relay and opening the second backup relay and the third backup relay, by the automated test controller.

14. The automated braking test method of claim 13, further including:

upon determining that an error is not present in the main relay, determining, by the automated test controller, whether an error is present in the first backup relay; and opening, by the automated test controller, the third backup relay upon determining that an error is present in the first backup relay.

15. The automated braking test method of claim 14, further including:

when an error is not present in the first backup relay, determining, by the automated test controller, whether an error is present in the second backup relay; and closing the first backup relay and opening the fourth backup relay, by the automated test controller, upon determining that an error is present in the second backup relay.

16. The automated braking test method of claim 15, further including:

upon determining that an error is not present in the second backup relay, detecting, by the automated test controller, whether an error is present in the third backup relay; and maintaining, by the automated test controller, the first backup relay in an open state, upon determining that the error is present in the third backup relay.

17. The automated braking test method of claim 16, further including:

upon determining that an error is not present in the third backup relay, detecting, by the automated test controller, whether an error is present in the fourth backup relay; and closing the first backup relay and maintaining the second backup relay in an open state, by the automated test controller, upon determining that an error is present in the fourth backup relay.

18. The automated braking test method of claim 17, wherein, upon determining that an error is not present in the fourth backup relay, the automated test signal is transferred by the automated test controller to the braking controller, and the braking control of the vehicle is performed by the automated test controller according to the automated test signal.

* * * * *